Oct. 10, 1950   B. W. BADENOCH   2,525,255
COOKING DEVICE

Filed Jan. 25, 1946   3 Sheets-Sheet 1

INVENTOR.
BENJAMIN WILSON BADENOCH
BY
ATTORNEY

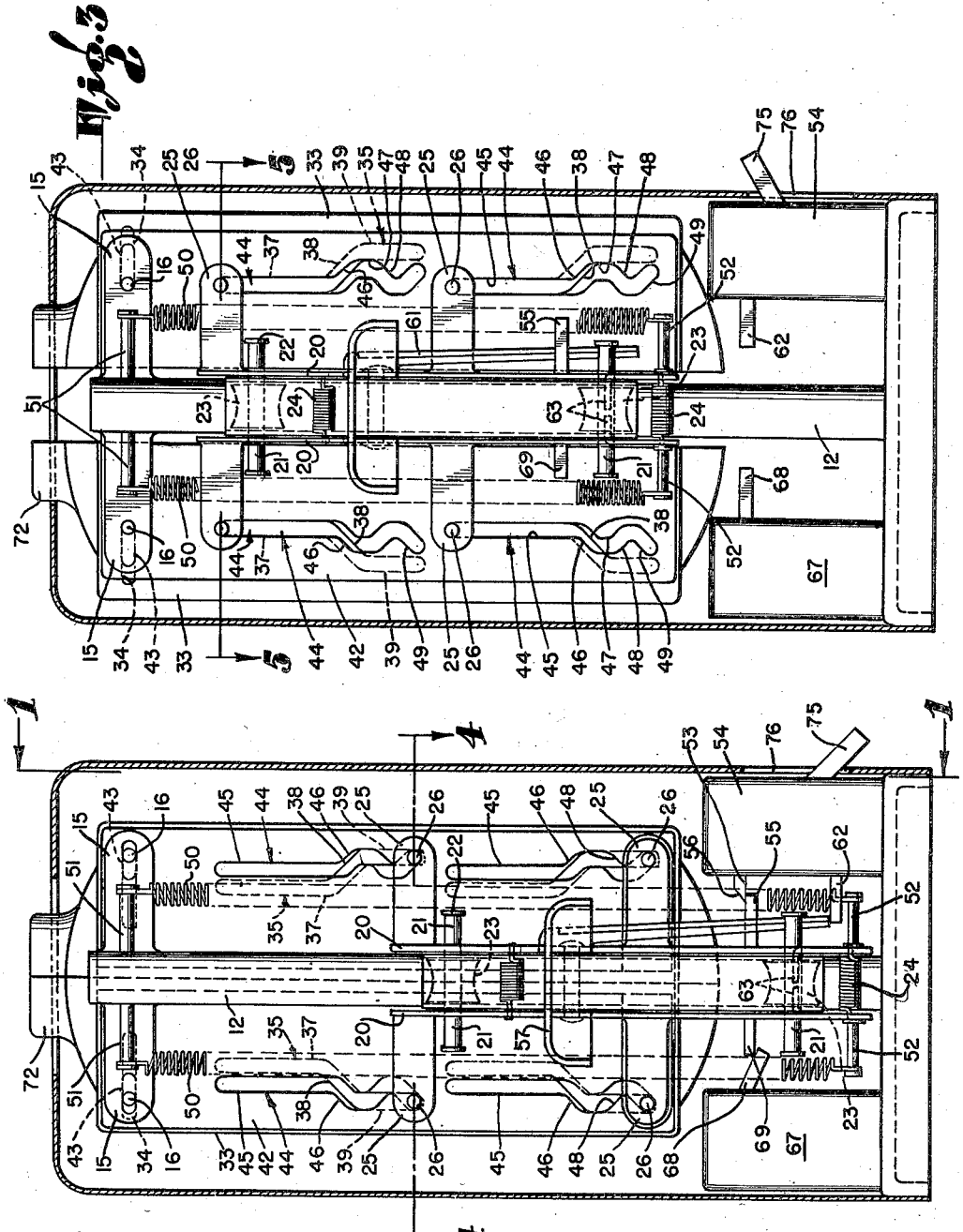

Oct. 10, 1950     B. W. BADENOCH     2,525,255
COOKING DEVICE
Filed Jan. 25, 1946     3 Sheets-Sheet 3
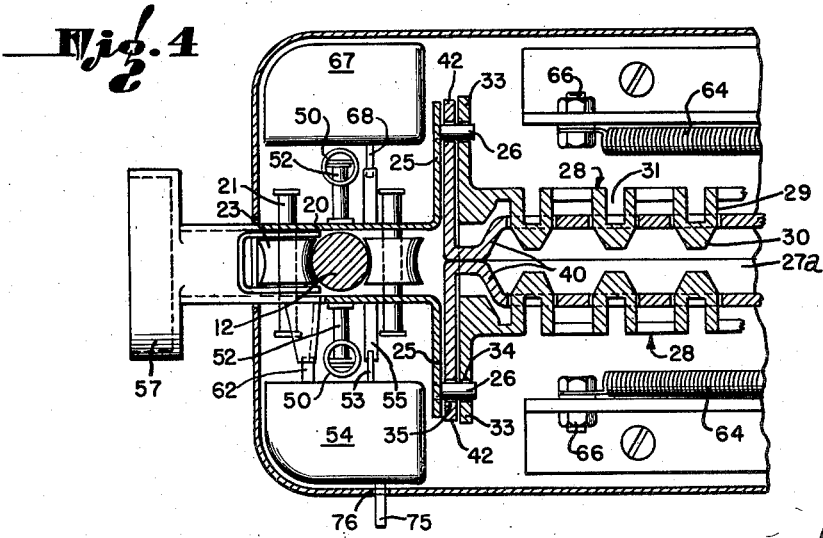
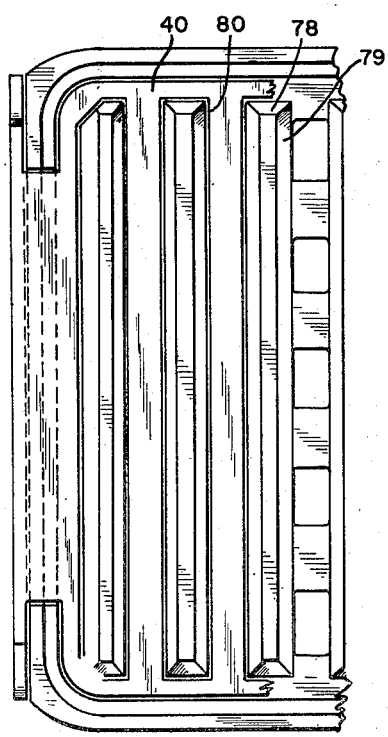
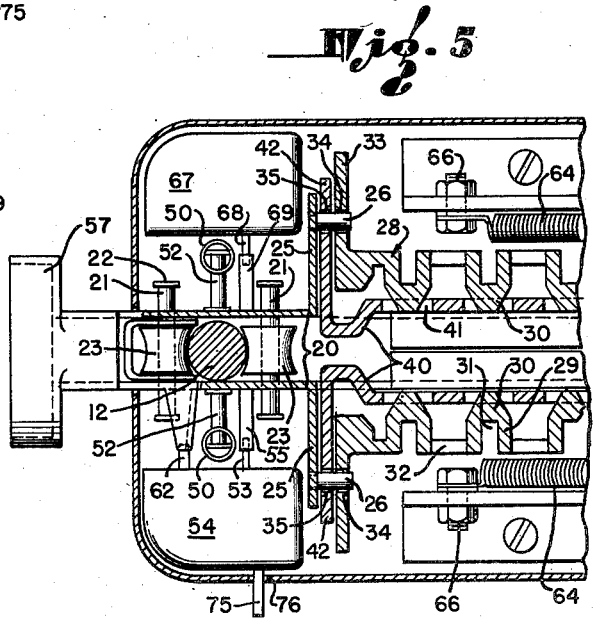
INVENTOR.
BENJAMIN WILSON BADENOCH
ATTORNEY Patented Oct. 10, 1950

2,525,255

UNITED STATES PATENT OFFICE 2,525,255

COOKING DEVICE

Benjamin Wilson Badenoch, Los Angeles, Calif.

Application January 25, 1946, Serial No. 643,380

15 Claims. (Cl. 99—373)

This invention relates to cooking devices and, more particularly, to devices for making baked products, such as waffles and the like.

It is to be understood that the device has various uses, such as in the molding or cooking of any material where sticking to the molding or cooking surface is a problem, or where automatic ejection from the mold is desired. However, the invention is shown and described embodied in a waffle iron.

The art of molding and cooking batter on or between heated grills or the like, is well known. Nevertheless, in the present commonly known art a number of difficulties, inconveniences and problems are inherent, particularly in the domestic waffle iron. Although various means have been proposed to solve these problems they have not been entirely satisfactory, as far as I am aware.

Among these difficulties, inconveniences, and problems are the following: The space required for the device when it is in storage or in use, is generally excessive; the method of filling is awkward; and there is a serious problem in preventing sticking of the batter to the grill. This tendency of the batter to stick to the grill if the combination of batter consistency, grill temperature, and grill surface conditions are not just right, will result in the tearing of the cooked product when removal is attempted, and the result is that cleaning of the grill surfaces is required before cooking may be resumed. Even when the final product is removed without external damage, the delicate internal structure is often fractured by the tension to which it is subjected when the grills are separated during removal. A further difficulty is inherent in the present methods of removal of the waffle in that there is danger of burning the fingers of the operator unless considerable care is exercised. Further, precise timing of the cooking period, in order to obtain a properly cooked product, is difficult and the result is non-uniformity from one piece to the next.

It is an object of the present invention to provide a device for cooking or baking waffles and the like, which will overcome the foregoing difficulties and inconveniences, and will solve the above problems.

It is another object of the invention to provide a device of this character having mechanically actuated means for breaking loose any adhesion between the grilling surfaces and the cooked batter to permit easy removal of the latter.

Still another object is to provide a cooking device in which the cooking or grilling surfaces are formed to vent air, steam or other gases so that it will not be trapped between the surfaces and the batter.

It is a further object of the invention to cause said cooked batter to be spaced away from any protuberances of teeth in the molding and grilling surfaces so that said cooked batter may be moved freely in a direction parallel with said surface and permit easy removal either by hand or by mechanical means.

It is a further object of the invention to dispose the grills in an upright or vertical position in order to conserve space and to permit filling to a predetermined level in order to give uniformity in waffle size and to facilitate removal of the cooked waffle by mechanical means.

A still further object of the invention is to provide spring loading of the opposed grills and molding surfaces in order to hold the grills in intimate contact with each other along their edges during the filling of the device, and yet allow for expansion of the cooking batter by pushing the grills apart against the spring load. This results in a lighter texture for the product than would result if the grills were mechanically latched together.

It is a further object of the invention to provide a device of this character wherein the grill and molding surfaces are of such character as to minimize sticking or adhesion of the cooking batter to said surfaces.

With respect to the last mentioned object, greatly improved results are attained by using aluminum or an aluminum alloy for the base of the grills and the like, having a coating or plating of chromium. The aluminum or aluminum alloy provides high heat conductivity and promotes even heating or baking of the batter, and the chrome plated surface is highly effective in preventing adhesion or sticking of the cooking batter to the surfaces of the grills.

It is an object of the invention to provide a device of this character which is convenient and easily operated.

It is another object of the invention to provide a device of this character which will cook a waffle, break its surfaces loose from the surfaces of the containing members and eject the waffle, when properly baked, to a position whereat it can be easily removed from the device.

Still another object of the invention is to provide a device of this character having two structures for disengaging both sides of the waffle after it is cooked or baked.

It is a further object of the invention to provide a device of this character wherein all surfaces of the waffle are disengaged from adjacent structures.

A still further object of the invention is to provide a device of this character wherein the cooking members are laterally separable.

Still another object of the invention is to provide a device of this character that is automatically controlled.

Further objects and advantages of the invention will appear from the following part of the specification.

In the drawings, which are for illustrative purposes only,

Fig. 2 is an end view taken on line 2—2 of Fig. 1, and showing the mechanism in the closed position for baking;

Fig. 3 is a view similar to Fig. 2 but showing the device in the open position;

Fig. 4 is a section taken on line 4—4 of Fig. 2;

Fig. 5 is a section taken on line 5—5 of Fig. 3; and

Fig. 6 is a fragmentary view of a modification of the grill and plate.

Figure 1:
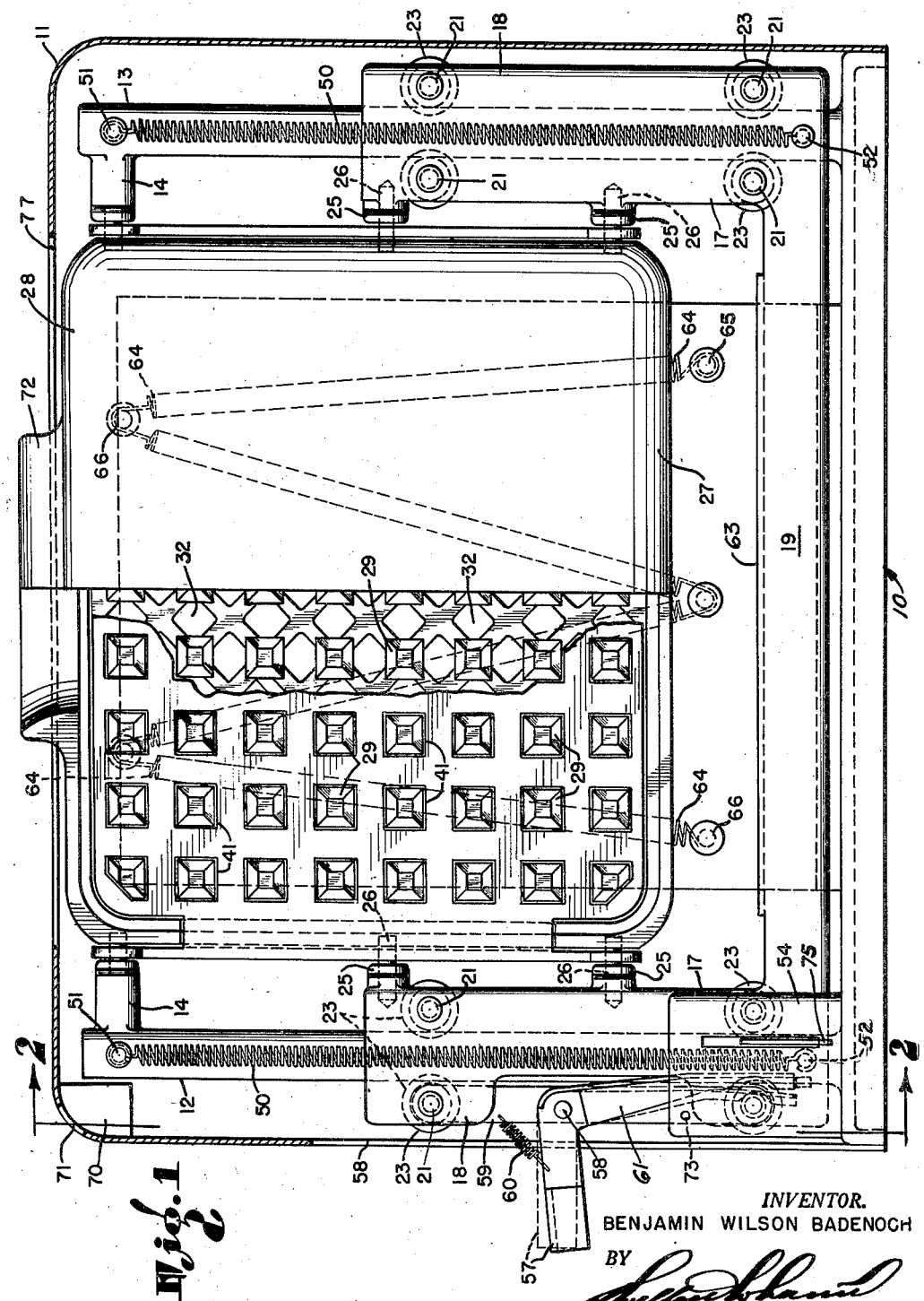
Fig. 1 is a side elevation of a cocking device, partially in section, embodying the present invention.

Referring to Fig. 1, reference numeral 10 indicates a base to which a rectangular shell 11 is secured by welding, or by any other suitable means. Support members 12 and 13 are attached to the base and extend vertically within the shell adjacent the end thereof. Each support has a portion 14 which extends laterally thereof toward each other, and to the ends of which transverse plates 15 are secured by welding or the like, or said plates may be formed integral with said portion 14. Each plate is provided with pins 16 adjacent the respective ends thereof. These pins support a cooking receptacle which will be more fully described hereinafter and may in some embodiments be located elsewhere on the cooking receptacle.

The supports 12 and 13 serve as guides for a frame, indicated generally at 17, which comprises a pair of oppositely disposed plate members of substantially U-shaped construction. Each member includes vertically extending portions, indicated generally at 18, and a substantially horizontal portion 19 connecting the lower ends of the portions 17 and 18.

The plates of the frame are disposed on opposite sides of the guides 12 and 13 and each plate includes a longitudinally extending portion 20 adjacent respective sides of said guides. The vertical portions of the frame are connected together by pins 21 which normally extend beyond the outer face of the parts 20 of said frame, each end of the pins 21 having a head 22 to limit lateral movement of the frame members, and each of said pins having a roller 23 secured thereto between the parts 20 of the frame. The rollers are so arranged that there are two adjacent the top of the vertical parts of the frame on opposite sides of the respective guides 12 and 13, and there are two on opposite sides of said guides adjacent the lower ends of said vertical portions, although, if desired, rollers need be provided only for one guide, particularly guide 12. The parts 20 of the frame are yieldingly urged toward each other by springs 24 vertically spaced apart and having their respective ends connected to said parts 20. The purpose of this arrangement will be described hereinafter.

Each of the parts 20 has a pair of vertically spaced outwardly extending arms 25, the upper and lower arms of said parts 20 being in horizontal alignment with each other, and a pin or cam follower 26 is provided adjacent the end of each arm.

The frame 17 provides actuating means for the cooking receptacle, indicated generally at 27, and comprising a pair of opposed members or grids 28 disposed vertically and defining a chamber 27a therein. The walls of the grids are relatively thin and inasmuch as both grids are of the same construction, a description of only one of them will be given.

Each grid is shown as having the usual pattern of inward projections or teeth which are arranged in rows, both vertically and horizontally. Each projection includes a square portion 29 secured to the body of the grid and a frusto-pyramidic free end portion 30. Each of the projections have a recess 31, and the grid is provided with perforations 32 between the projections, in order to secure a better transfer of heat to the product being baked.

Adjacent each end of the grids is an outwardly extending flange 33, and each flange 33 is provided with a slot 34 in which the pins 16 are received, so that the upper ends of the grids are supported by said pins and said grids may have lateral movement. Each flange 33 also is provided with slots 35 which are in vertically spaced relationship to each other. These slots are all of the same configuration and each includes an upper vertical portion 37, an outwardly and downwardly extending portion 38 and a second vertical portion 39, said slots receiving the pins 26.

Within the receptacle 27 each grid is provided with a member 40 which forms part of the cooking surface and which, for convenience, will be termed an anti-stick plate, or merely a plate.

Each plate 40 is provided with perforations 41 having a cross-sectional shape similar to the cross-sectional shape of the portion 29 of the projections or teeth of the grid, so that the plate may have relative movement with respect to the grid. Normally, the inner faces of the plates 40 are in substantially the same plane as the base of the frusto-pyramidic portion 30 of the projections. However, the plates may move outwardly and inwardly relative to this normal position for a purpose to be hereinafter described.

The ends of the plates 40 extend outwardly of the grids and have laterally turned oppositely disposed flanges 42 having slots 43 adjacent the upper ends in which the pins 16 are received. The flanges 42 are interposed between the members 25 and the flanges 33 of the grids, and the pins 16 serve to support the grids and plates adjacent their upper ends while the slots permit lateral movement of said plates.

Each of the flanges 42 of the plates are also provided with a pair of vertically spaced slots 44 which extend in a generally vertical direction. These slots include an upper vertical part 45, and outwardly and downwardly inclined part 46, a short substantially vertical portion 47, a downwardly and inwardly inclined portion 48, and a downwardly and outwardly inclined portion 49. The pins 26 are received in these slots as well as in the slots 35, and as said pins traverse the slots relative movement between the grids and the plates is effected, as will be described in greater detail hereinafter.

Resilient means is provided for moving the frame 17 from its lower position, as shown in Figs. 1 and 2, to the raised position shown in Fig. 3. This means comprises a pair of springs 50 on opposite sides of the guides 12 and 13, having their upper ends secured to pins 51 fixed in the respective guides 12 and 13 adjacent the upper ends thereof. The opposite ends of the springs 50 are secured to pins 52 fixed in the respective frame parts adjacent the bottom of said frame.

During the cooking process the frame is in the lowermost position and is held in this position by a latch 53 of a timing device indicated generally at 54. The latch 53 is adapted to engage an arm 55 which extends from the part 20 of one of the frame members, and the free end of the arm 55 is held beneath the latch 53, as best shown in Fig. 2. The latch 53 is yieldingly urged to the outer position and has a cam surface 56 which permits the arm 55 to pass same so that the frame may be moved to the lower position by means of a handle 57 pivotally secured at 58 to a cage 59. The cage is a channel-like piece which straddles the rollers 23 on the adjacent side of the guide 12, and has openings adjacent the respective ends thereof for reception of respective pins 24 which retain said cage in position.

There is a light spring 60 which has its ends attached respectively to the handle and cage, and is adapted to urge the handle in a clockwise direction as shown in Fig. 1.

The handle has a member 61 which extends downwardly thereof adjacent one of the parts 20 of the frame. When the handle is urged downwardly the relative forces of the springs 50 and 60 are such that the spring 60 will yield and the handle and member 61 will move to the position shown by solid lines in Fig. 1, whereat the lower free end of said member 61 will engage a projecting arm 62 of the timing device 54. As the handle moves downwardly, carrying the frame to its lowermost position and loading same for its operative movement, the arm 62 will be moved downwardly to the position shown in Fig. 2. The arm 62 is connected to the well-known rack arrangement of the timing device, for winding the clock mechanism thereof, said timing device being of any well-known type. The timing device may also include the well-known thermostatic control which adjusts the length of the timing interval to the temperature of the receptacle. The timing interval may also be manually adjustable by any well known means, not shown. When the frame 17 reaches the lower, cocked position, the arm 55 will be engaged by the latch 53 for holding said frame in said position. The handle 57 will be held in the above described solid line position due to the frictional engagement of the free end of member 61 with the arm 62, and the operation of the clock mechanism will be prevented as long as the arm 62 is in engagement with the member 61.

In order to start the timing mechanism, the handle is raised manually to the dotted line position shown in Fig. 1. This results in the disengagement of the member 61 with the arm 62. The clock mechanism will then begin to function and the arm 62 will begin to move upwardly. When the proper time interval has elapsed the arm 62 will be adjacent its upper limit of movement and the appropriate mechanism of the timing device will cause retraction of the latch 53 to permit the springs 50 to raise the frame, which will result in the breaking loose of the cooked batter from the adjacent cooking surfaces, as will be more fully described hereinafter.

The present invention also includes means for at least partially ejecting the cooked batter, and this means comprises the substantially horizontal flanges 63, formed by turning portions of the horizontal parts 19 of the frame 17 inwardly toward each other.

Heating means for cooking the product is also provided and comprises the usual resistance wires 64 on each side of the receptacle 27, the ends of said wires being attached to terminals 65 and 66 for connection with a suitable source of electric current. While the heating means is shown as being disposed in the space between the shell 11 and the receptacle, said heating means may be of any well-known type mounted integrally with the parts to be heated, that is, the respective parts of the receptacle, and flexibly connected to the terminals 65 and 66.

The heating means and mold parts are so constructed and related as to maintain a substantially balanced temperature of the mold parts during the warm-up period and during a cooking operation. The inflow of heat to each mold part is proportional to the area exposed to radiant heat from the wires 64 and the temperature rise during preheating will be the same if the exposed area has the same ratio to the volume in both parts. During cooking heat transfer to the batter is proportional to the surface area in contact with the batter and if this area is in the same ratio to the volume in both parts the temperature drop due to the cooling effect of the batter will be the same.

In the construction shown this balancing of the heating and cooling effects is obtained by making the openings 32 in the grids of the proper total area and by forming the recesses 31 in the grid teeth to reduce the volume of metal and to increase the area exposed to the heating means. I have found that when the parts are proportioned about as shown an excellent heat balance is obtained so that very uniform cooking is provided.

The current to the wires or coils 64 may be controlled by any conventional switch or by a switch mechanism such as that indicated generally at 67, and which may be of any well known construction. In this arrangement the switch includes a lever 68 which is pivoted within the housing of the switch 67 and which has its free end disposed in the path of an arm 69 which extends laterally from the adjacent part 20 of the frame. The switch is so constructed and arranged that when the lever is in the upper position, as shown in Fig. 3, the switch is open and no current passes to the coils 64, and when said lever is disposed in the downward position, as shown in Fig. 2, the switch is closed, said switch being so loaded as to be normally open. Thus, when the frame 17 is in its upper position, the current to the coils 64 is off, and when said frame is in its lower position, the switch is closed and the coils are heated.

In some embodiments, it will be desirable to use a switch at 67 of the well known thermostatic type which will shut the current off when a predetermined temperature is reached within the device, and turn it on again when the temperature drops substantially below said predetermined temperature.

If desired, the circuit for the coils 64 may also include a temperature indicating device 70, of any well-known type. For example, this device 70 may be thermostatically controlled for indicating, by a colored light (such as green) when the iron or device has been heated to the proper grilling or cooking temperature. The light may be viewed through an aperture 71 in the shell 11. Alternately, a red light may be in series with the above mentioned thermostat switch and will be extinguished when the switch shuts off the current at said predetermined temperature, thereby giving a visual indication that this temperature has been reached.

In operation, the frame 17 is moved to the downward latched position, by means of the handle 57, as hereinabove described. The timing mechanism is then wound and the circuit to the coils 64 is then completed so that said coils begin to heat the receptacle. When the light of the indicator 70 indicates that the proper cooking temperature has been reached, batter is then poured into the chamber 27a of the receptacle through the funnel-shaped aperture 72 at the top of said receptacle, said aperture being defined by extensions of the upper edges of the grills 28. The proper level of the batter in the receptacle will be readily determined by experience. The handle 57 is then raised sufficiently to rotate the member 61 out of the path of the arm 62, thereby immediately starting the timing mechanism by release of said arm 62. It is to be noted that when the handle 57 is raised it assumes the dotted line position shown in Fig. 1, and is limited in its clockwise movement by a stop 73 fixed in the cage 59, the handle being normally retained in the dotted line position by the spring 60.

Should the cooking batter expand, the sides of the receptacle will move laterally outwardly against the loading of the springs 24. However, during this expansion each grid 27 and its respective plate 40 are held in the proper relationship by their mutual engagement with the pins 26.

A batter receptacle formed in a plurality of parts as shown provides an improved cooking operation in addition to facilitating removal of the cooked article. In filling a cooking device such as a waffle iron with batter a certain amount of air may be trapped between the batter and the cooking surfaces. Also during cooking, steam or gases may be released by the batter and be trapped between the batter and the cooking surfaces. This results in holding the batter away from the cooking surfaces so that it may not be uniformly cooked, and the presence of steam tends to soften the article so that a crisp, browned surface cannot be obtained.

With a receptacle or mold according to the present invention, the air, steam or gases are allowed to escape through the openings 41 in the plate 40 around the projections or teeth 30 so that the batter can contact the cooking surfaces uniformly throughout. It will be noted that escape of air, steam or gas can occur throughout the entire receptacle surface regardless of the fact that the two parts forming the surface may fit closely but that the spaces between the parts are too small to permit the escape of any batter. Thus the batter will be cooked uniformly throughout to provide an article of improved texture, flavor and appearance.

At the end of the proper time interval for cooking or baking the batter, the arm 62 will approach and reach its upper limit of movement. As said arm 62 reaches said position, the latch 53 will be retracted out of the path of the arm 55 and permit the springs 50 to lift the frame from the lower position, shown in Figs. 1 and 2, to the upper position, shown in Fig. 3.

As the frame is raised by the springs 50, the pins 26 move along the cam-like grooves 35 and 44 of the grill or grid and plates respectively, and first cause the plates to move outwardly into the recesses 31 of the grids, thus breaking the plates away from adjacent portions of the cooked waffle. The plates then return to their initial position whereat they rest against the surface of the waffle and support it, whereupon the grids are moved laterally outwardly to a position whereat the teeth thereof are withdrawn beyond the planes of the outer sides of the waffle. The pins 26, in the cam-like grooves 35 and 44, then cause the plates to move slightly outwardly to release the waffle from lateral pressure, and the horizontal flanges 63 of the frame 17 then engage the lower edge of said waffle and through the final portion of upward movement of the frame, raise the waffle upwardly through a slot 77 provided therefor in the upper edge of the casing 11, at which position the waffle may be easily removed with the fingers of the operator or with a fork or other implement without danger of burning the fingers of said operator.

It is to be noted that due to the fact that the pins 26 each are received in the respective grooves 35 and 44 of the grid and plate members, the above operation will occur to loosen and eject the waffle, whether the side parts of the receptacle are in the closed position or have been moved laterally outwardly due to expansion of the batter during the cooking process. If desired, the timing mechanism may have an emergency release such as the manually operated lever 75 which projects through a slot 76 in the adjacent wall of the shell 11.

The invention also provides surface conditions for the grids and the plates, which will minimize sticking of the waffle to the surfaces thereof, as well as providing high heat conductivity to promote even heating of the waffle. In providing such surface conditions it has been found that the use of aluminum grids and plates, or grids and plates of aluminum alloy or the like, plated or coated with a thin layer of chromium material, provide the best characteristics for the above conditions. The aluminum or aluminum alloy provide the desired high and uniform heat conductivity which promotes even baking of the batter, and the chrome plating of the surface reduces to a minimum adhesion or sticking of the cooked batter to the surfaces of the grids and plates. It is to be particularly noted that this arrangement has been found to produce outstanding results.

In Fig. 6 there is shown an alternative arrangement of the projections of the grids. In this arrangement these projections are elongated members 78 which have free end portions 79 tapering inwardly. The plates 40 have elongated slots 80 in which the projections are received. The general operation of the present cooking device wherein the projections are of the character shown in said Fig. 6, is the same as that described in connection with the arrangement shown in Figs. 1 to 5 inclusive. It is to be noted that the projections 65 extend transversely of the grids, and when said grids are in the vertical position the baked waffle is moved longitudinally of said projections.

It should be noted that although the embodiment of the invention shown and described herein is in the vertical position, the novel features of construction will be equally operable and advantageous when used horizontally or at any other angle. Should the device be horizontally arranged, filling could be accomplished in the conventional way by lifting the upper grid and plate up from the lower grid and plate and the batter poured directly onto the latter, after which the upper member or grid would be replaced and the automatic cooking, releasing ejection of the cooked product would follow in sequence similarly as in the vertical embodiment, with the difference that said product would be ejected laterally.

It is also understood that a single grid and automatic stick plate will be advantageous in cooking or for molding when only one side of the batter is in contact with the molding surface.

In fact, in any application where a material is to be molded, the features of the invention will be useful in releasing the material from the mold and guiding it during ejection.

It is also to be understood that the device may be used in a multiple batter arrangement, or in a continuous plate-like arrangement for continuous molding material where releasing and guiding material after molding is a problem.

I claim as my invention:

1. In a cooking device, the combination of: a receptacle comprising a pair of toothed grids defining a chamber, means mounting said grids for relative lateral movement; a support for said receptacle; plates within the chamber in laterally spaced relationship to each other throughout the major part of their areas, said plates having perforations in which the teeth of the grids are slidably received, means mounting said plates for lateral movement relative to said grids and to each other; and means for effecting said movements of the grids and plates.

2. The invention defined by claim 1, wherein said means moves the plates laterally outwardly relative to the grid members and returns them to substantially their original position, whereat they will engage the cooked batter, then moves the grids laterally outwardly relative to said plates and finally moves said plates a limited amount laterally outwardly relative to each other.

3. The invention defined by claim 1, wherein said means is so constructed and arranged as to first move the plates laterally outwardly relative to the grids and return them to substantially their original position, whereat they will engage the cooked batter, then move the grid members laterally outwardly to a position whereat the teeth of said grids clear the adjacent sides of the cooked batter and finally move the plates a limited amount laterally relative to each other to release the cooked batter; and means for ejecting from the receptacle the product cooked therein.

4. In a cooking device, the combination of: a receptacle having an interior chamber and having a pair of structures for each side thereof; each of the structures including a plurality of relatively movable parts interfitting so that portions of all of the parts are exposed at the interior surface of the chamber and means for moving the parts relative to each other first in one direction and then in the other for disengaging the same from the adjacent sides of a product cooked in the chamber.

5. In a cooking device, the combination of: a receptacle comprising a pair of laterally separable members defining a chamber; means for supporting the receptacle in a substantially vertical position; anti-stick plates within the chamber in laterally spaced relationship to each other and to said members, said plates being arranged for lateral movement relative to each other and to said members; yielding means urging the members into engagement with each other for permitting lateral movement thereof to accommodate expansion of the product being cooked in the chamber; and means for effecting lateral movement of the members and the plates to break adhesion of the cooked product with the adjacent parts.

6. A cooking device comprising a plurality of parts fitting together to form a cooking surface, a support individually supporting the parts for individual movement relative to each other toward and away from the cooking surface and means for moving one of the parts relative to another away from the cooking surface and for thereafter moving said other of the parts relative to said one away from the cooking surface successively to loosen a cooked article from the parts.

7. A cooking device comprising a pair of relatively movable structures each including elongated spaced strips, the strips interfitting to form a cooking surface, a support individually supporting the structures for individual movement toward and away from the cooking surface and means for moving one of the structures relative to the other away from the cooking surface and for thereafter moving the other structure relative to the one structure away from the cooking surface.

8. A cooking device comprising a grid having a series of projections thereon, a plate fitting on the grid and having a series of openings therein to receive the projections, the plate and projections forming a cooking surface at one side, and heating means adjacent the other side of the grid and plate, the grid having openings therein through which the plate is exposed to radiation from the heating means.

9. In a cooking device for cooking batter, a structure forming a cooking surface to receive and hold batter during cooking, said structure being formed by a plurality of separate interfitting parts one of which has apertures therethrough and the other of which includes portions fitting in the apertures and having openings therethrough between said portions, said parts interfitting with a relatively small clearance therebetween to define relatively narrow elongated apertures to vent steam and gases but of such small width as to prevent the passage of batter.

10. A cooking device comprising a plurality of relatively moveable structures each having a plurality of spaced parts, the parts of the structures interfitting to form a cooking surface, cam mechanism movable relative to the structures, and connections between the structures and the cam mechanism operative upon relative movement of the structures and the cam mechanism first to move one of the structures relative to another away from the cooking surface and then to move said other of the structures relative to said one of the structures away from the cooking surface.

11. A cooking device comprising a pair of side structures spaced throughout their central portions to define a chamber capable of holding batter, each of the side structures including a pair of plates having interfitting parts movable laterally of the chamber, heating means to heat the side structures, and control means to move the plates of each pair relative to each other first in one direction and then in the other to release a cooked article first from one of the plates and then from the other.

12. A cooking device comprising a plate formed with an opening therein, a member fitting slidably in the opening for movement laterally of the plate, the plate and member cooperating to form a cooking surface to hold batter, heating means to heat the plate and member to cook the batter, and control means to move the member relative to the plate first in one direction and then in the other to release the cooked batter completely from both the plate and the member.

13. A cooking device comprising a frame, a pair of plates mounted on the frame for individual movement, the plates having slidably interfitting parts thereon forming a cooking surface, cooperating cam parts on the frame and the plates respectively for moving the plates laterally of the cooking surface, one of said parts having a compound cam surface to cause relative movement of the plates first in one direction and then in the other, and means to cause relative movement of the cam parts to produce said relative movement of the plates.

14. A cooking device comprising a frame, a pair of plates mounted on the frame for linear sliding movement, the plates having slidably interfitting parts thereon forming a cooking surface, cooperating cam parts on the frame and the plates respectively for moving the plates relative to each other transverse to the cooking surface as the plates slide on the frame, one of said parts comprising an elongated compound cam track to cause relative movement of the plates first in one direction and then in the other.

15. A cooking device comprising a batter supporting unit formed of separate parts each having spaced portions, the spaced portions interfitting to define a batter supporting surface at one side of the unit and there being openings between the spaced portions so that they are exposed at the other side of the unit, heating means on the other side of the unit to supply heat thereto by radiation, the volumes of said parts being in substantially the same ratio to the area thereof exposed to the heating means and at the cooking surface whereby the temperature of the parts will remain substantially balanced during operation.

BENJAMIN WILSON BADENOCH.

REFERENCES CITED

The following references are of record in the file of this patent:

UNITED STATES PATENTS

| Number | Name | Date |
| --- | --- | --- |
| 677,648 | Eugster | July 2, 1901 |
| 1,124,363 | Valentine | Jan. 12, 1915 |
| 1,546,347 | Simmons | July 14, 1925 |
| 1,641,455 | Quatman | Sept. 6, 1927 |
| 1,659,610 | Noeth et al. | Feb. 21, 1928 |
| 1,746,698 | Galer | Feb. 11, 1930 |
| 1,862,965 | Maragos | June 14, 1932 |
| 1,954,022 | Noeth et al. | Apr. 10, 1934 |
| 1,978,872 | Warton | Oct. 30, 1934 |
| 2,091,324 | Leichter | Aug. 31, 1937 |
| 2,171,510 | Stirgwolt | Aug. 29, 1939 |
| 2,300,061 | Purpura | Oct. 27, 1942 |
| 2,355,153 | Gomersall | Aug. 8, 1944 |
| 2,359,580 | Poole | Oct. 3, 1944 |
| 2,387,586 | Humphrey | Oct. 23, 1945 |

FOREIGN PATENTS

| Number | Country | Date |
| --- | --- | --- |
| 26,981 | Australia | May 30, 1931 |
| 224,904 | Great Britain | June 11, 1925 |